United States Patent [19]
Pandit

[11] Patent Number: 5,859,636
[45] Date of Patent: Jan. 12, 1999

[54] RECOGNITION OF AND OPERATION ON TEXT DATA

[75] Inventor: Milind S. Pandit, Beaverton, Oreg.

[73] Assignee: Intel Corporation, Santa Clara, Calif.

[21] Appl. No.: 579,568

[22] Filed: Dec. 27, 1995

[51] Int. Cl.[6] .................................................. G06F 3/00
[52] U.S. Cl. .......................................... 345/335; 707/501
[58] Field of Search .................................... 345/339, 349, 345/352, 353, 335; 707/501

[56] References Cited

PUBLICATIONS

"TAPI—The Biggest Roundup Ever Published," Computer Technology, May 1995, p. 55.
"Apple Introduces Internet Address Detectors," Newsbytes, 29 Sep. 1997.
"E–Mail 'Net Differences–. . . ," CommunicationWeek, 6 Jan. 1997 p. 12.
"Internet Update," Newbytes, 10 Sep. 1997.
"McWorld–Apple, Partners Launch Live Objects," Newsbytes, 8 Aug. 1996.

*Primary Examiner*—A. Katbab
*Attorney, Agent, or Firm*—Duane, Morris & Heckscher LLP

[57] ABSTRACT

Text of a predetermined class is recognized in a body of text. After recognition, operations relevant to the recognized text may be performed. For example, text such as telephone numbers, telefax numbers, and dates can be recognized in a body of text. Options are provided for selecting and running operations and programs relevant to the recognized text, such as, telephone dialers, telefaxing programs, writable databases etc. Libraries of subroutines are provided for each class of text to be recognized. Each library typically includes a plurality of operations which may be run on the particular class of text. The libraries are recognized at run time of an application, so that additional libraries and operations may be added without a need for recompiling. A single class of text is recognizable in a number of formats without limits as to the origin of the body of text.

40 Claims, 9 Drawing Sheets

RECOGNITION OF AND OPERATION ON TEXT DATA

BACKGROUND OF THE INVENTION

1. Field of the Invention

This invention relates to the field of text data processing.

2. Description of the Related Art

Word recognition involves an ability to recognize selected words in a document or the like. One example of word recognition is the searching of large volumes of text, such as encyclopedias or legal case books, using key words or search terms. A user typically locates relevant segments of information from within large volumes by specifying a word or words which must appear in the segment in order for it to be retrieved. Generally, other limiters are used, such as commands which require that the searched for words appear in a same sentence or paragraph, or within a predetermined number of words from one another. Boolean connectors also figure prominently in this type of searching. Generally, therefore, this type of word recognition involves searching a large body of text for the presence of one or more words, which possibly are arranged in a predefined order. No operations are performed other than retrieval of a portion of text which includes the selected words and the words are not recognized as part of a general class.

Other word recognition and operation features are known. Generally, programs which provide for word recognition and for operations using or on the recognized words require the words to have been created by the program. For example, conventional applications that allow users to perform word recognition and operations on the words typically require that the words be created using the application. Words created using any other application are not recognizable and may not be operated on. Consequently, words created using a particular word processing or database program can be recognized and operated on only by the word processing or database program responsible for their creation. Examples of the conventional operations which can be performed on words by conventional word processing or database programs include spell checking, finding and replacing, etc.

The present invention will benefit any application which displays text to a user, regardless of the origin of the text. The invention expands the operations which may be performed using recognized text by allowing a user to intuitively exploit the presence of certain classes or types of text in any document by transforming the text into an interface to other functions or operations.

SUMMARY OF THE INVENTION

The invention pertains to recognition of text in a body of text as belonging to a predetermined class and performing an operation relevant to the recognized text.

BRIEF DESCRIPTION OF THE DRAWINGS

The following detailed description will be more fully understood with reference to the accompanying drawings in which.

DETAILED DESCRIPTION OF THE PREFERRED EMBODIMENTS

Figure 1A:
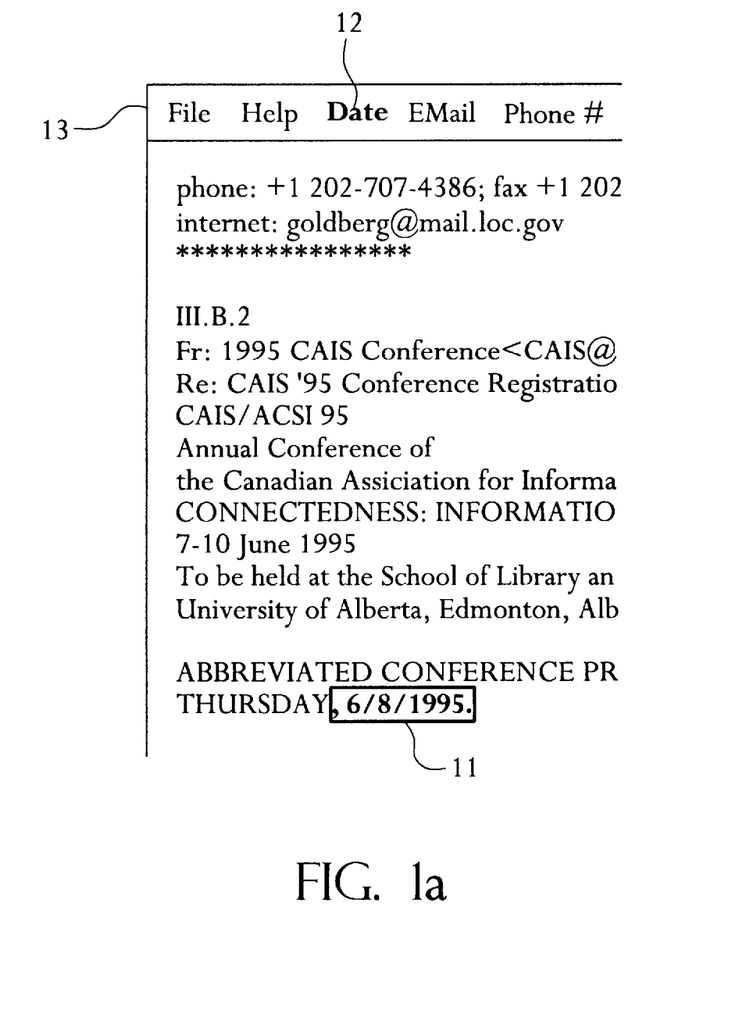
FIGS. 1a–1f are graphic representations of recognized text on video monitors in accordance with the invention.
Figure 1B:
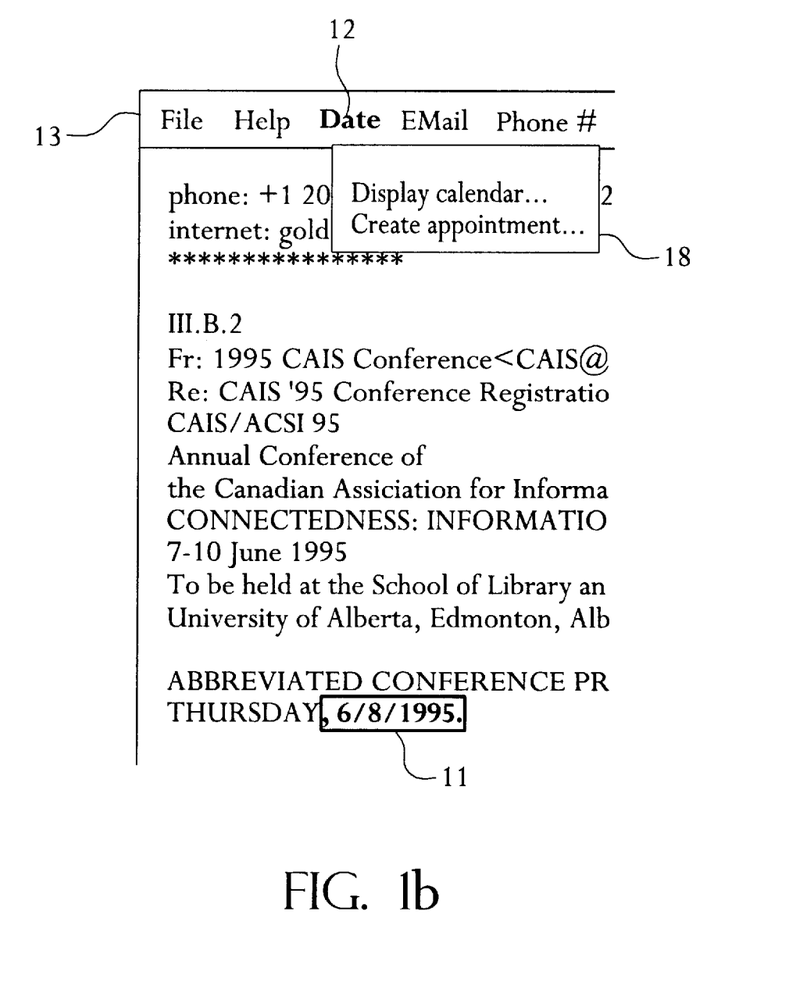
Figure 2:
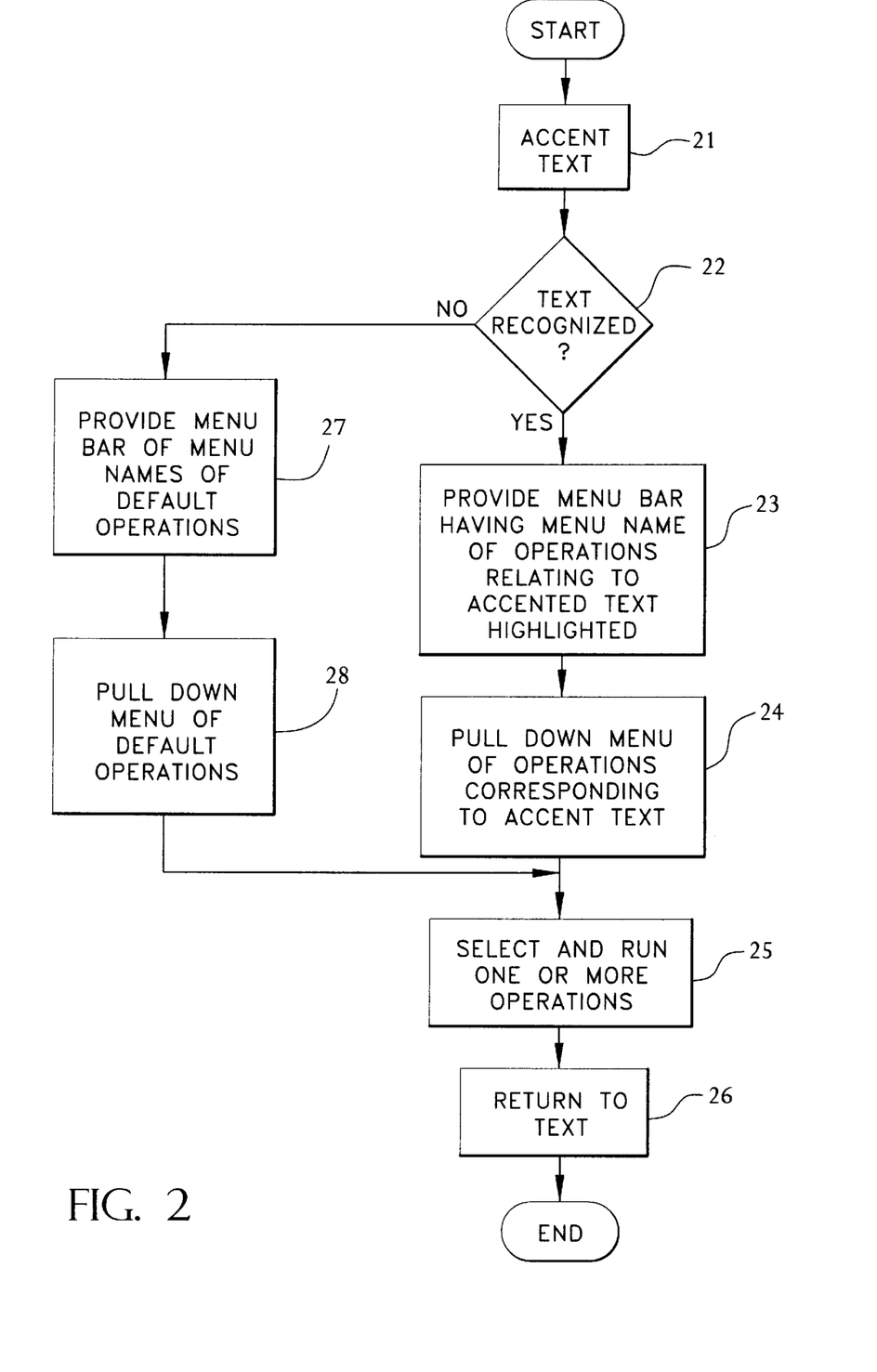
FIG. 2 is a flow chart diagram of the operation of the test recognition and operation features of the invention.

The invention selectively recognizes text and performs relevant operations based on the recognition. Referring to FIG. 1a and FIG. 2, for example, a date 11 in text appearing on a video monitor is accented (step 21 of FIG. 2) for example by shading, underlining or pointing to and clicking on the text. The invention recognizes the accented text (step 22), and provides a menu bar 13 in which the name of menu 12 corresponding to the class of text accented is highlighted or shown in bold type, thereby showing that the menu is enabled (step 23). In the example of FIG. 1a, the Date menu 12 is shown in bold type, signifying that the invention includes a menu of operations and/or programs which are relevant to dates. A user can "click" on the Date menu name 12 or otherwise call the menu by one or more keystrokes on a keyboard associated with the video monitor to display or pull down the contents of the menu (step 24). A view of an embodiment of a pulled-down Date menu 18 is shown in FIG. 1b. A user may directly call a calender or appointment database program from pulled-down menu 18. Other programs may be included in pulled-down date menu 18 as discussed below.

As shown in FIGS. 1c–1f, the invention is not limited to the recognition of dates in text and preferred embodiments of the invention can recognize e-mail addresses and telephone numbers. In fact, there is no limit on the type of text which can be recognized by the invention and additional embodiments can recognize such classes of text as Uniform Resource Locators, nouns, verbs, names, street addresses, etc.

The pull-down menus provided by the invention identify the operations and/or programs which relate to the class of text accented, highlighted or otherwise indicated. For example, referring again to FIG. 1a where date 11 has been accented and recognized by the invention, the pulled-down menu 18 can identify operations and/or programs relevant to dates, such as the calendar program and appointment programs shown as well as a To-Do list program, an anniversary database, a scheduling program etc. . . . A user is able to run one or more of the programs relevant to dates which are identified in the pulled-down menu in a known manner, such as by clicking on the name of the program as it appears in the pulled-down menu (step 25) or through the execution of one or more keyboard key strokes. In the example shown, therefore, a user is able to record in, for example, a calendar program, an upcoming event mentioned in a body of text in which a date has been recognized. The user may then quickly return to the body of text (step 26).

Figure 1C:
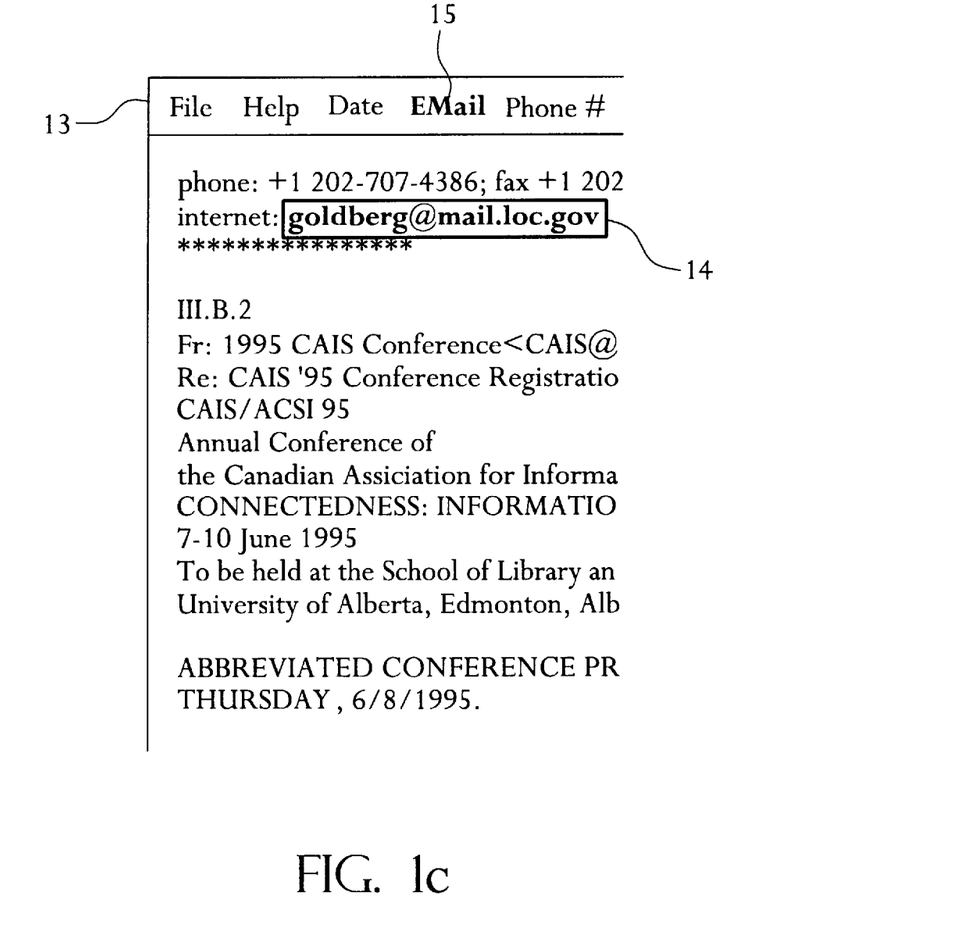
Figure 1D:
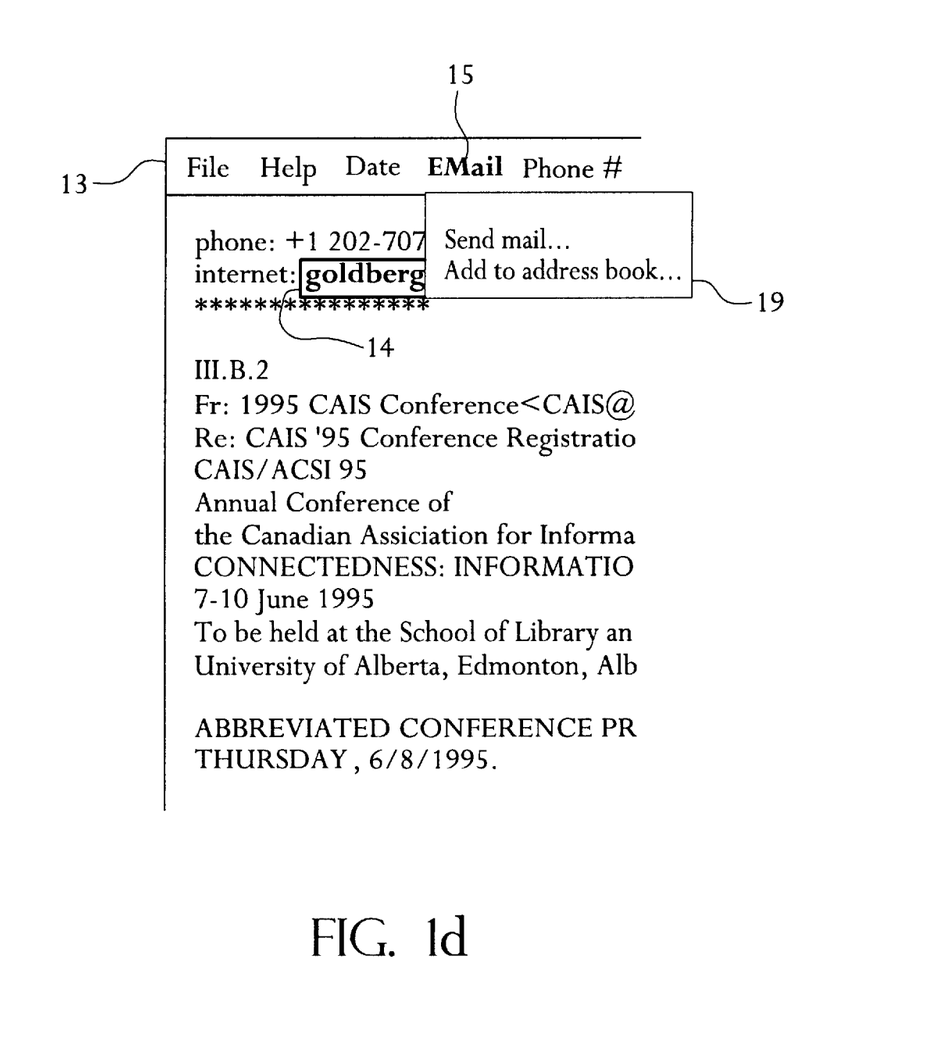

Referring to FIG. 1c, an e-mail address 14 is accented. In this example, a user may click on the highlighted menu name EMail 15 to pull-down the menu. The EMail menu preferably includes, for example, an identification of programs and operations related to EMail and EMail addresses. An embodiment of pulled-down EMail menu 19 is shown in FIG. 1d. Included in pulled-down Email menu 19 are such programs as a writable Email or general address book database and an EMail template and transmitting program, preferably automatically addressed with the accented address recognized in the text, etc. Any other program related to EMail sending or address storage may be included as within the scope of this invention.

Figure 1E:
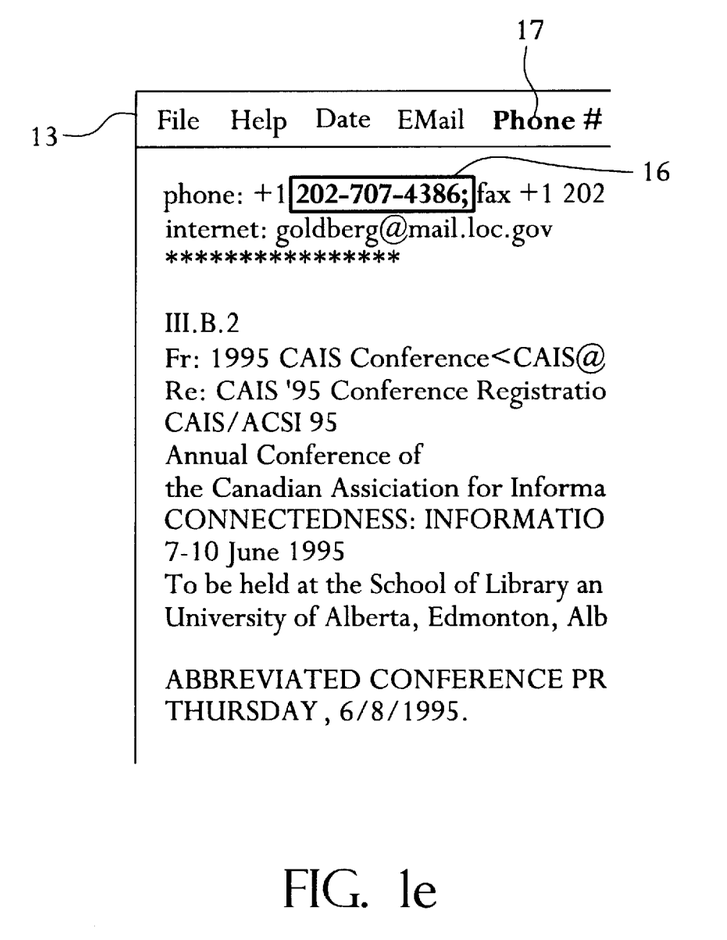
Figure 1F:
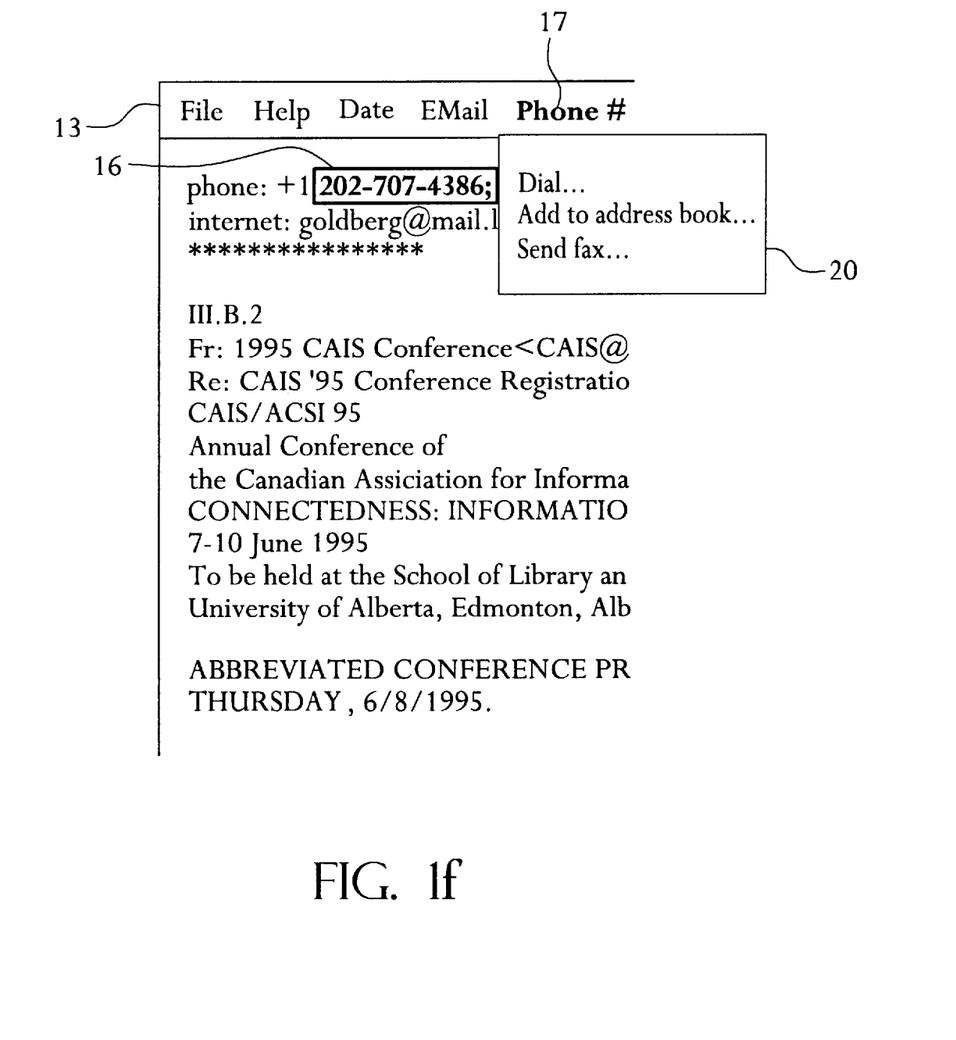

Referring now to FIG. 1e, a telephone number 16 is accented. The pull down menu named Phone #17 is highlighted and preferably identifies the executable operations and/or programs which are relevant to telephone and telefax numbers. As shown in FIG. 1f on pulled-down menu 20, possible programs include a writable computer database of telephone and telefax numbers, a program which instructs a properly equipped computer to dial the number accented, a program which generates a template for the preparation of a fax message and which subsequently causes a properly equipped computer to transmit the message to the accented number, etc. Again, any program related to telephone or telefax numbers can be included in pulled-down menu 20 for direct accessing in accordance with the teachings of this disclosure.

Where the invention is capable of recognizing nouns or verbs, pull-down menus can, for example, identify executable programs which provide the meaning of the highlighted word, appropriate synonyms and the singular or plural version of the noun or conjugation of the verb.

As noted above the invention preferably includes a library enabling recognition of Uniform Resource Locators (URLs) in text. Consequently, preferred programs which appear on and can be run from the pull-down menu in response to the accenting and subsequent recognition of a URL include World-Wide Web browser programs, such as "NETSCAPE" or "NCSA MOSAIC."

In a preferred embodiment, in the event the accented text is not recognized, i.e., the text is not of the specific type or class recognizable by any of the libraries provided, a menu bar having a list of one or more menu names of default operations can be made to appear (step 27). The invention preferably includes as default operations such programs as spell-checkers, grammar-checkers, a thesaurus, a dictionary, execution of an EMail program to transmit the text, programs to store the text and any other programs relating to words in general. Of course, the names of the default programs appear on one or more pull-down menus (step 28) corresponding to the one or more menu names.

Figure 3:
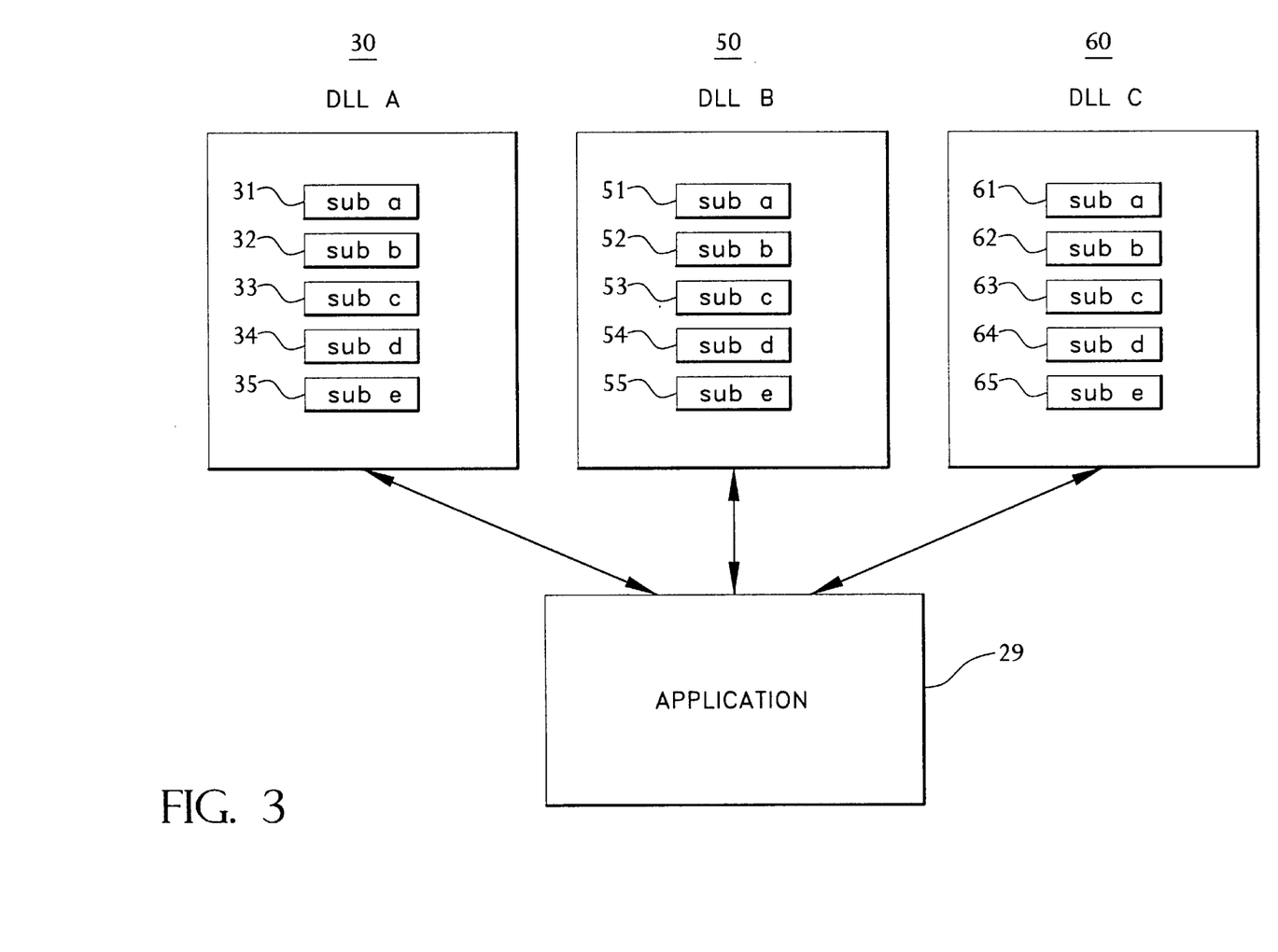
FIG. 3 is a block diagram of the libraries of the invention.

Referring now to FIG. 3, the invention is implemented in one or more modular libraries of subroutines. The libraries can be Dynamically Linked Libraries as understood by those skilled in the art with "MICROSOFT" operating systems. Every subroutine performs a distinct task. In FIG. 3, three libraries 30, 50 and 60 are shown, although the number of libraries which are possible is limited only by the number of possible operations which may be performed. Each library preferably holds five sets of subroutines. For example, Libraries A, B and C each include subroutines a, b, c, d and e. Subroutines a and c are concerned with the class or type of text data recognized by the Library. Subroutines b, d and e are concerned with the operations performed by the Library on the recognized text.

Library A concerns, for example, recognizing and performing operations on dates in text as described above in reference to FIGS. 1a and 1b. Subroutine a (31) of Library A preferably detects a class or type of text data, in this case, dates. Generally, subroutine a is a parser capable of recognizing a class or type of text data in a number of formats. In the case of Library A, the parser subroutine a is able to recognize, for example, date text written in a number of variations, for example 1/1/99, 1/1/1999, 1-1-99, January 1, 1999 etc.

Subroutine c (33) of Library A provides the menu name corresponding to Library A and its text recognition and operating functions. For example, subroutine c provides the name Date or Dates 12. This name appears in menu bar 13, as shown in FIG. 1a and can be displayed in bold-face type or emphasized in some other way whenever date text has been recognized to signify that a number of operations are available for running on the date text.

Subroutine d (34) of Library A identifies the particular number of operations which can be performed on the date text and correlates to the number of operations implemented by subroutine b. Each operation is identified by a number between and including 1 and the value returned by subroutine d.

Given a number identifying an operation, subroutine e (35) of Library A identifies the name of the operation. Examples of the names of the operations which can be run on date text include Schedule, To-Do List, Anniversary, etc. Subroutine e provides the names of the operations as they appear in pull-down menu 18.

Given a number identifying an operation, subroutine b (32) of Library A performs the identified operation on the recognized text data. For example, subroutine b can call scheduling programs, writable calendar databases, writable to-do list databases, anniversary book databases and any other number of programs or operations relevant to dates.

A person of ordinary skill will understand that any additional libraries, such as Libraries B and C shown in FIG. 3 will have subroutines generally related in function to the subroutines of Library A for implementing the invention with respect to other classes of text. For example, the subroutines of Library B preferably are directed to implementing the invention with respect to EMail addresses in a document and the subroutines of Library C are directed to implementing the invention with respect to telephone and telefax numbers, as shown in FIGS. 1b–1f. Other libraries may be added to, for example, operate on URLs, nouns, verbs, names street addresses, etc.

Conventionally, a software program must be entirely recompiled for its functionality to be increased or its operations changed in any manner. The present invention, however, is highly modular and allows libraries to be added at will and additional features to be added to libraries without recompiling. For example, by implementing libraries as "MICROSOFT" Component Object Model Servers or by using equivalent standards known to those skilled in the art, each library is recognized and utilized using the same programming interface, i.e., though the function and results of the subroutines a–e differ from library to library, every library has subroutines a–e. Consequently, an application which is written to recognize and utilize one library can automatically recognize and utilize any other library. Furthermore, an application which is written to recognize and utilize more than one library can automatically recognize and utilize any number of other libraries. Additional libraries can be added at any time, without recompiling, and an application using standards known to those skilled in the art will recognize the addition of one or more libraries at run-time. For example, an application 29 using the invention will use standards known to those skilled in the art to check for the presence of any libraries. Once recognized, the application 29 will be able to use any or all of the libraries.

Figure 4:
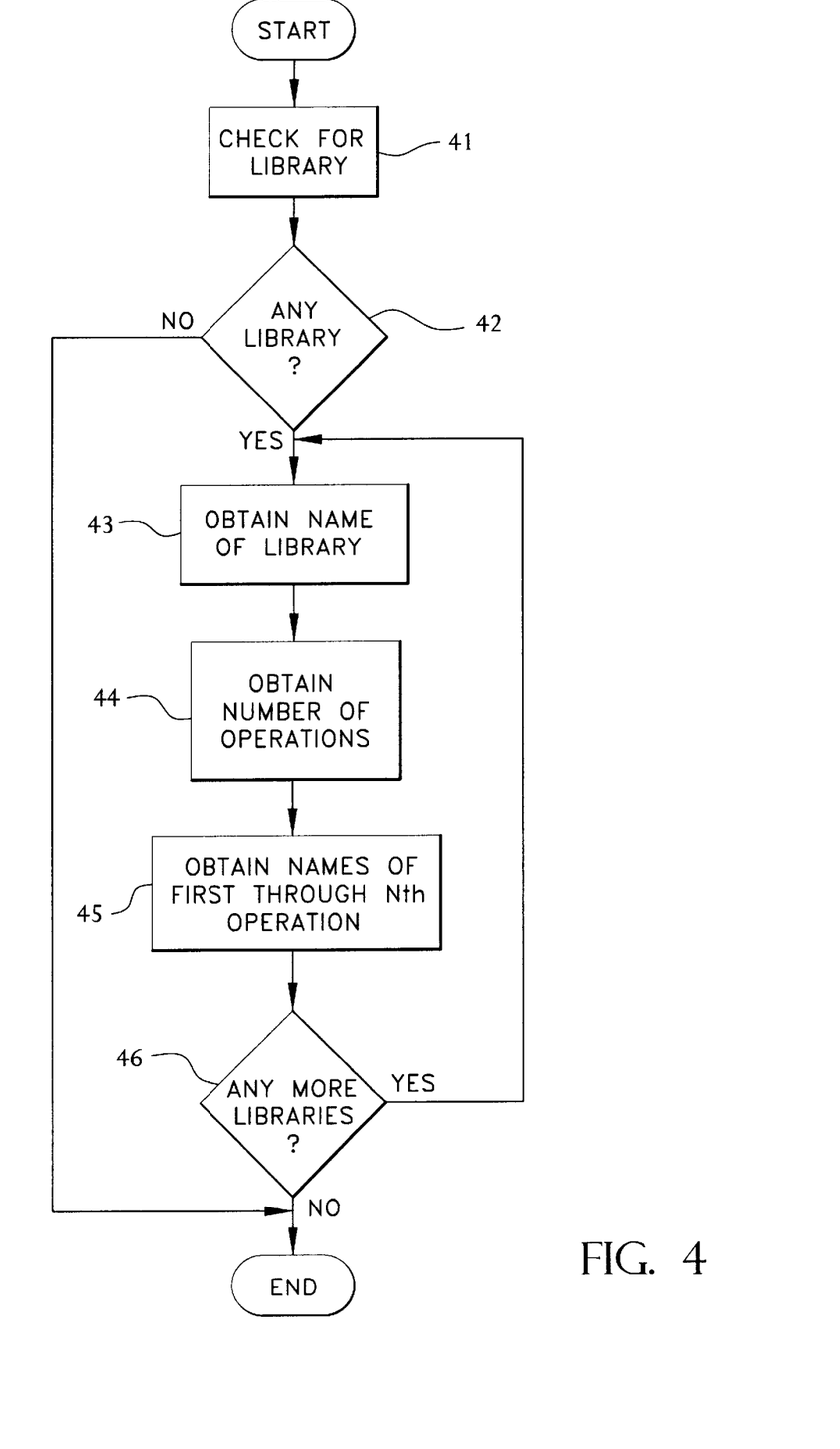
FIG. 4 is a flow chart diagram of the menu building features of the invention.

The invention also allows additional features to be added to a library without recompiling. For example, additional operations can be installed in a library at any time, and recognized by application 29 at run-time. For example, at run-time, application 29 will build the appropriate menus relating to the one or more types of data which are recognizable. At run-time, application 29 will identify, for example, the presence of Library A (steps 41 and 42 of FIG. 4). Subroutine c of Library A informs application 29 of the name of the Library (step 43), which of course will be used as one of the names of the menu of operations of appearing in the menu bar. Application 29 subsequently queries subroutine d of Library A for the number of operations Library A is capable of performing on the recognized data (step 44). Subroutine e provides to application 29 the names for each of the number of operations identified, e.g. Schedule, Calendar, To-Do, Anniversary, etc. (step 45). Application 29 will repeat the process outlined above to build menus relating to every library which is part of the invention (Step 46). This menu-building procedure at run time allows libraries to be added and to be upgraded at any time, for example to add additional operations performable on a piece of recognized text, without a need for recompiling the program.

Conventional programs that provide any text recognition and operation capabilities, i.e., find and replace, etc. require the text to be embedded in, for example, a document created by the program. This invention does not require that the text be embedded in any document created on or by a particular application program. Any text appearing on a video monitor can be operated on by the invention, whether the text is within an EMail message, World-Wide Web site, created by a word processing or database program, etc. Furthermore, by using parsers as the subroutines for detecting certain types of data, the invention is able to recognize data appearing in a number of formats, rather than a single defined format.

The present invention can be embodied in the form of computer-implemented processes and apparatuses for practicing those processes. The present invention also can be embodied in the form of computer program code embodied in tangible media, such as floppy diskettes, CD-ROMS, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

When implemented on a general-purpose microprocessor, the computer program code segments configure the microprocessor to create specific logic circuits.

Furthermore, it should be understood that various changes in the details, materials, and arrangements of the parts which have been described and illustrated in order to explain the nature of this invention may be made by those skilled in the art without departing from the principle and scope of the invention as expressed in the following claims.

What I claim is:

1. A computer-implemented method for processing a selected text, comprising the steps of:
   (a) recognizing the selected text as belonging to a predetermined class, a computer performing the step of recognizing, including:
      (1) comparing a format of the selected text to a predetermined format associated with the predetermined class,
      (3) recognizing the selected text as belonging to the predetermined class if the format of the selected text matches the predetermined format; and
   (b) performing an operation associated with the predetermined class using the recognized text as a parameter.

2. The method of claim 1, wherein step (a) comprises the step of:
   (i) displaying a plurality of menu names, and
   (ii) emphasizing, relative to any other displayed menu name, a menu name of a menu identifying one or more operations associated with the predetermined class, which may be performed on the recognized text.

3. The method of claim 2, wherein step (b) comprises the steps of:
   (i) displaying the menu; and
   (ii) starting one or more operations from the one or more operations identified on the menu.

4. The method of claim 2, wherein:
   step (i) comprises the steps of:
      (1) checking for a library of the one or more operations; and
      (2) obtaining the name of the library; and
   step (ii) comprises the steps of:
      (1) obtaining a number of the one or more operations in the library; and
      (2) obtaining names for each of the number of operations.

5. The method of claim 4, further comprising the step of:
   (3) repeating steps (i)1, (i)2, (ii)1 and (ii)2 for each library present.

6. The method of claim 1, wherein the text appears in a body of text, further comprising the step of:
   (c) returning to the body of text.

7. The method of claim 1, wherein the text is one of a date, name, telephone number, telefax number, e-mail address, and Uniform Resource Locator.

8. The method of claim 7, wherein the operation is the starting of a writable, computer database application.

9. The method of claim 7, wherein the text is a Uniform Resource Locator and the operation is the starting of a World-Wide Web browser application.

10. The method of claim 7, wherein the text is an EMail address and the operation is the starting of an EMail message preparing and transmitting application.

11. The method of claim 7, wherein the text is a telephone number and the operation is the starting of an application causing a modem to dial the telephone number.

12. The method of claim 7, wherein the text is a telefax number and the operation is the starting of telefax message preparing and transmitting application.

13. A method according to claim 1, wherein step (a) includes:
   (1) comparing the format of the selected text to a plurality of predetermined formats associated with the predetermined class, and
   (2) recognizing the selected text as belonging to the predetermined class if the format of the selected text matches any one of the plurality of predetermined formats.

14. A method according to claim 1, wherein step (a) is performed a plurality of times, for a plurality of predetermined classes, respectively, and the selected text is recognized as belonging to one of the plurality of predetermined classes, further comprising the step of:
   displaying a plurality of menu names, each associated with a respectively different one of the plurality of predetermined classes;
   emphasizing the respective menu name associated with the one of the plurality of predetermined classes to which the selected text belongs, relative to menu names that are not associated with the plurality of predetermined classes.

15. An apparatus for text processing, comprising:
(a) means for recognizing a selected text as belonging to a predetermined class, including:
   (1) means for comparing a format of the selected text to a predetermined format associated with the predetermined class,
   (2) means for recognizing the selected text as belonging to the predetermined class if the format of the selected text matches the predetermined format; and
(b) means for performing an operation associated with the predetermined class using the recognized selected text as a parameter.

16. The apparatus of claim 15, wherein means (a):
(i) displays a plurality of menu names, and
(ii) emphasizes, relative to any other displayed menu name, a menu name of a menu identifying one or more operations associated with the predetermined class, which may be performed on the recognized text.

17. The apparatus of claim 16, wherein means (a):
generates a menu name of a menu of one or more operations by:
   (1) checking for a library of the one or more operations; and
   (2) obtaining the name of the library; and
generates a menu for listing the one or more operations by:
   (1) obtaining a number of the one or more operations in the library; and
   (2) obtaining names for each of the number of operations.

18. The apparatus of claim 16, wherein means (b):
(i) displays the menu; and
(ii) starts one or more operations to be run from the one or more operations identified on the menu.

19. The apparatus of claim 15, wherein the text appears in a body of text, further comprising:
(c) means for returning to the body of text.

20. The apparatus of claim 15, wherein the text is one of a date, name, telephone number, telefax number, e-mail address and Uniform Resource Locator.

21. The apparatus of claim 20, wherein the operation is the starting of a writable, computer database application.

22. The apparatus of claim 20, wherein the text is a Uniform Resource Locator and the operation is the starting of a World-Wide Web browser application.

23. The apparatus of claim 20, wherein the text is an EMail address and the operation is the starting of an EMail message preparing and transmitting application.

24. The apparatus of claim 20, wherein the text is a telephone number and the operation is the starting of an application causing a modem to dial the telephone number.

25. The apparatus of claim 20, wherein the text is a telefax number and the operation is the starting of telefax message preparing and transmitting application.

26. Apparatus according to claim 15, wherein the recognizing means includes:
   (1) means for comparing the format of the selected text to a plurality of predetermined formats associated with the predetermined class, and
   (2) means for recognizing the selected text as belonging to the predetermined class if the format of the selected text matches any one of the plurality of predetermined formats.

27. Apparatus according to claim 15, wherein the recognizing means performs recognition a plurality of times, for a plurality of predetermined classes, respectively, and recognizes the selected text as belonging to one of the plurality of predetermined classes, further comprising:
   means for displaying a plurality of menu names, each associated with a respectively different one of the plurality of predetermined classes;
   means for emphasizing the respective menu name associated with the one of the plurality of predetermined classes to which the selected text belongs, relative to menu names that are not associated with the plurality of predetermined classes.

28. A storage medium encoded with machine-readable computer program code for text processing, comprising:
(a) means for causing a computer to recognize a selected text as belonging to a predetermined class, including:
   (1) means for comparing a format of the selected text to a predetermined format associated with the predetermined class,
   (2) means for recognizing the selected text as belonging to the predetermined class if the format of the selected text matches the predetermined format; and
(b) means for causing the computer to perform an operation associated with the predetermined class using the recognized selected text as a parameter.

29. The storage medium of claim 28, wherein means (a) causes the computer to:
(i) display a plurality of menu names, and
(ii) emphasize, relative to any other displayed menu name, a menu name of a menu identifying one or more operations associated with the predetermined class, which may be performed on the recognized text.

30. The storage medium of claim 29, wherein means (b) causes the computer to:
(i) display the menu; and
(ii) start one or more operations to be run from the one or more operations identified on the menu.

31. The storage medium of claim 28, wherein the text appears in a body of text, further comprising:
(c) means for causing the computer to return to the body of text.

32. The storage medium of claim 28, wherein the text is one of a date, name, telephone number, telefax number, e-mail address, street address and Uniform Resource Locator.

33. The storage medium of claim 32, wherein the operation is the starting of a writable, computer database application.

34. The storage medium of claim 32, wherein the text is a Uniform Resource Locator and the operation is the starting of a World-Wide Web browser application.

35. The storage medium of claim 32, wherein the text is an EMail address and the operation is the starting of an EMail message preparing and transmitting application.

36. The storage medium of claim 32, wherein the text is a telephone number and the operation is the starting of an application causing a modem to dial the telephone number.

37. The storage medium of claim 32, wherein the text is a telefax number and the operation is the starting of telefax message preparing and transmitting application.

38. The storage medium of claim 32, wherein:
means (a) causes the computer to:
   (1) check for a library of the one or more operations; and (2) obtain the name of the library, to generate a menu name of a menu of the one or more operations; and
(1) obtain a number of the one or more operations in the library; and
(2) obtain names for each of the number of operations, to generate a menu for listing the one or more operations.

39. A storage medium according to claim 28, wherein means (a) includes:
   (1) means for causing the computer to compare the format of the selected text to a plurality of predetermined formats associated with the predetermined class, and
   (2) means for causing the computer to recognize the selected text as belonging to the predetermined class if the format of the selected text matches any one of the plurality of predetermined formats.

40. A storage medium according to claim 28, wherein means (a) causes the computer to perform recognition a plurality of times, for a plurality of predetermined classes, respectively, and causes the computer to recognize the selected text as belonging to one of the plurality of predetermined classes, further comprising:
   means for causes the computer to display a plurality of menu names, each associated with a respectively different one of the plurality of predetermined classes;
   means for causes the computer to emphasize the respective menu name associated with the one of the plurality of predetermined classes to which the selected text belongs, relative to menu names that are not associated with the plurality of predetermined classes.

* * * * *

UNITED STATES PATENT AND TRADEMARK OFFICE
CERTIFICATE OF CORRECTION

| | | |
|---|---|---|
| PATENT NO. | : 5,859,636 | Page 1 of 1 |
| APPLICATION NO. | : 08/579568 | |
| DATED | : January 12, 1999 | |
| INVENTOR(S) | : Pandit | |

It is certified that error appears in the above-identified patent and that said Letters Patent is hereby corrected as shown below:

In column 5, at line 63, delete, "(3)" and insert --(2)--.

Signed and Sealed this
Twenty-sixth Day of July, 2011

David J. Kappos
*Director of the United States Patent and Trademark Office*